FIP8212 OR 3,673,412
250/201

United States Patent [15] 3,673,412
Olson [45] June 27, 1972

[54] RADIANT ENERGY BEAM SCANNING METHOD AND APPARATUS

[72] Inventor: Gaylor G. Olson, Inglewood, Calif.

[73] Assignee: TRW Inc., Redondo Beach, Calif.

[22] Filed: March 2, 1970

[21] Appl. No.: 15,372

[52] U.S. Cl. ................250/201, 179/100.3 B, 179/100.3 V, 250/202, 250/219 Q, 340/173 LM
[51] Int. Cl. ........................................G01j 1/20, G11b 7/08
[58] Field of Search ............................179/100.3 B, 100.3 V; 340/173 LM; 250/219, 201, 202, 203

[56] References Cited

UNITED STATES PATENTS

| | | | |
|---|---|---|---|
| 3,337,718 | 8/1967 | Harper et al. | 179/100.3 V |
| 3,501,586 | 3/1970 | Russell | 340/173 LM |
| 2,972,660 | 2/1961 | Toulon | 179/100.3 B |
| 3,409,799 | 11/1968 | Kurzweil, Jr. et al. | 178/DIG. 29 |

*Primary Examiner*—J. Russell Goudeau
*Attorney*—Daniel T. Anderson, Donald R. Nyhagen and Jerry A. Dinardo

[57] ABSTRACT

A radiant energy beam scanning method and apparatus having means for projecting a beam of radiant energy toward and bringing the beam to focus within a scanning plane, scanning means for deflecting the beam laterally to cause scanning motion of the beam along a prescribed scan track within the scanning plane, and servo means for sensing lateral departure of the beam from the scan track, generating tracking error signals related to the direction of such departure, and controlling the scanning means in response to the tracking signals to maintain the beam on the scan track. A recording and playback method and apparatus embodying the scanning apparatus for recording a data track on a record and subsequently playing back the data track.

8 Claims, 7 Drawing Figures

Gaylord G. Olson
INVENTOR

BY [signature]
ATTORNEY

Gaylord G. Olson
INVENTOR

BY Donald R. Nyhagen
ATTORNEY

Gaylord G. Olson
INVENTOR.

BY

ATTORNEY

RADIANT ENERGY BEAM SCANNING METHOD AND APPARATUS

BACKGROUND OF THE INVENTION

1. Field of the Invention

This invention relates generally to radiant energy beam scanning apparatus and method. More particularly, the invention relates to a novel method of an apparatus for effecting precise scanning motion of a radiant energy beam along a prescribed scan track. The invention relates also to a data recording method and apparatus which utilizes the beam scanning technique to effect prescribed scanning motion of a radiant energy beam over a recording medium to initially record a data track on the medium and subsequently playback the data track. Another aspect of the invention relates to a record for the playback apparatus.

2. Prior Art

The present invention is concerned generally with the problem of effecting prescribed scanning motion of a radiant energy beam in such a way as to cause the beam to trace a prescribed scan pattern or track within a scanning plane transverse to the beam. Beam scanning methods and apparatus for this general purpose are well-known in the art. Such scanning systems, for example, are disclosed in prior art U.S. Pat. Nos. 2,416,135; 2,477,640; 3,023,662; and 3,235,672. These existing beam scanning systems, however, are characterized by certain significant deficiencies which the present invention seeks to overcome. These deficiencies are most evident and may be best explained in connection with one particularly useful application of such beam scanning techniques. The application referred to constitutes a second important aspect of the invention and involves initial recording of a data track on a recording medium and subsequent playback of the data track. In this regard, attention is directed to the fact that the present beam scanning method and apparatus may be utilized in a wide variety of applications other than that just mentioned. However, since the mentioned application constitutes both an important aspect of the invention and a principal use of the present beam scanning apparatus, the invention will be disclosed in connection with this particular application.

Beam scanning systems of the general class to which the present invention pertains are characterized, in general terms, by a source of radiant energy, means for projecting a radiant energy beam from the source to a scanning plane to produce a scanning energy field in the plane, and means for effecting scanning motion of the beam along a prescribed scan track in the scanning plane. The existing scanning systems of this type may be divided into two general categories, to wit, those in which the radiant energy source, itself, is mechanically driven in a scanning motion to cause the radiant energy beam to trace a prescribed scan track, and those in which the radiant energy source is stationary and the radiant energy beam is deflected to cause prescribed scanning motion of the beam. The aforementioned U.S. Pat. Nos. 2,416,135 and 3,235,672 disclose beam scanning systems of the first type. The remaining two patents, U.S. Pat. Nos. 2,477,640 and 3,023,662 disclose beam scanning systems of the second type.

Beam scanning systems of the first type, that is systems employing a mechanically driven radiant energy source, are deficient in that they tend to be complex in construction, bulky in size, and ill-suited to data recording and playback applications which require relatively high density data storage. A major deficiency of the existing beam scanning systems of the second type, that is scanning systems in which the radiant energy beam is deflected to cause prescribed scanning motion of the beam, resides in the fact that they employ an open loop beam scanning action. In other words, such scanning systems have means for imparting a prescribed scanning motion to the radiant energy beam but lack means for detecting the actual scan path of the beam and thereby tracking error of the beam, i.e., lateral departure or drift of the scanning energy field of the beam from its prescribed scan track, and controlling the beam scanning means to return the beam on its prescribed scan track. The scanning system disclosed in the aforementioned U.S. Pat. No. 2,477,640, for example, comprises a cathode ray tube in which the radiant energy beam, an electron beam, is driven in its prescribed motion by applying proper voltages to the horizontal and vertical deflection circuits of the tube. However, no provision is made for sensing the actual scan path traced by the beam on the face of the tube and correcting the deflection voltages to cause the beam to trace, with a high degree of accuracy, its prescribed scan track.

It is evident, of course, that the scanning accuracy provided by an open loop scanning technique may be sufficiently high for many applications. In other applications, however, such as the data recording and playback application contemplated in the present invention, the scanning accuracy required may be substantially higher than that which can be attained with an open loop scanning system. Moreover, as it will appear from the later description, the data recording and playback application and possibly other applications of the present scanning system present an additional scanning requirement which is not satisfied by the scanning systems disclosed in the aforementioned patents nor by other known beam scanning systems. The requirement referred to involves extreme concentration of the radiant energy beam within the scanning plane so as to provide within the plane a highly concentrated scanning energy field or scanning spot of minute size on the order of a few microns in diameter. In this regard, for example, it should be noted that the scanning field or spot produced on the face of the cathode ray tube in U.S. Pat. No. 2,477,640 is relatively large in comparison to this spot diameter. In addition, the size of the scanning field or spot, like the scanning pattern of the radiant energy beam, is controlled by an open loop system rather than a closed loop feedback system. Accordingly, no positive constraint is imposed on the spot size, as is desirable, if not mandatory in precision, high density data recording and playback applications such as that contemplated in the present invention.

The particular beam scanning system disclosed in U.S. Pat. No. 2,477,640, and other similar beam scanning systems, are characterized by other deficiencies. Foremost among these other deficiencies are the adverse requirements of high and potentially hazardous voltages and complex electronic circuitry for providing such voltages, a fragile glass envelope which also presents a serious safety hazard, and relatively high cost.

SUMMARY OF THE INVENTION

One important aspect of the present invention is concerned with a novel beam scanning method and apparatus for effecting precise scanning motion of a radiant energy beam along a prescribed scan track within a scanning plane transverse to the beam. According to this aspect, the invention provides a scanning method and apparatus embodying a closed loop scanning action wherein the actual scan path of the scanning beam is continuously sensed or detected and corrected, when required, to maintain the beam on its prescribed scan track. More specificially, precise scanning motion of the beam is accomplished by generating tracking error signals in response to and related to the direction of lateral departure or deviation of the scanning beam from its prescribed scan track and regulating or correcting the scanning motion of the beam to return the latter to its prescribed track. In the illustrative embodiment of the invention, for example, precise scanning motion of the scanning beam is achieved by placing in the scanning plane a servo plate containing a servo track or tracks conforming to the desired prescribed scan track of the beam. The beam emerges from the plate either by transmission through or reflection from the plate. The servo tracks modulate the incident beam energy in response to lateral departure of the beam from the prescribed track to provide in the beam emerging from the plate tracking error information representing the direction of the beam departure. Positioned in the path of the emergent modulated beam energy is a receiver which is sensitive to the beam energy and generates an electrical signal containing tracking error components representing the tracking error information present in the modulated beam energy. The tracking error components present in the receiver output are amplified and detected to produce a resultant tracking error signal which is applied to the beam scanning means to correct the scanning motion of the beam.

A second important aspect of the present invention is concerned with recording a data track on a recording medium and playing back the data track from the medium. According to this aspect, the radiant energy scanning beam is projected onto a sensitized recording medium in such a way as to produce a small scanning energy field or spot on the medium. The beam is then driven in a prescribed scanning motion to cause the scanning field or spot to trace a preselected scan track on the recording medium. Simultaneously, the beam intensity is modulated with the signal to be recorded so as to produce a recorded data track on the medium. During playback, essentially the same procedure is repeated to cause the scanning spot or field to traverse the previously recorded data track. This data track modulates the radiant energy incident on the track to provide a modulated energy field which is detected and converted to an electrical output representing the recorded data. The present recording and playback apparatus is referred to herein as transcribing apparatus.

According to another unique and important feature of the invention, the size of the scanning field or spot produced in the scanning plane by the radiant energy beam is regulated with a closed loop servo or focusing action to provide and maintain a highly concentrated scanning field or spot.

A third important aspect of the invention is concerned with a unique data record for use in the present playback apparatus. This record contains data and servo tracks. A primary advantage of the present data recording and playback invention resides in the fact that it permits high density data recording. The disclosed embodiment of the invention, for example, is effective to record and playback a high density spiral data track on a recording medium or record which is on the order of 2 inches square. This record is capable of containing a musical recording of normal duration.

DESCRIPTION OF THE PREFERRED EMBODIMENTS

Figure 1:
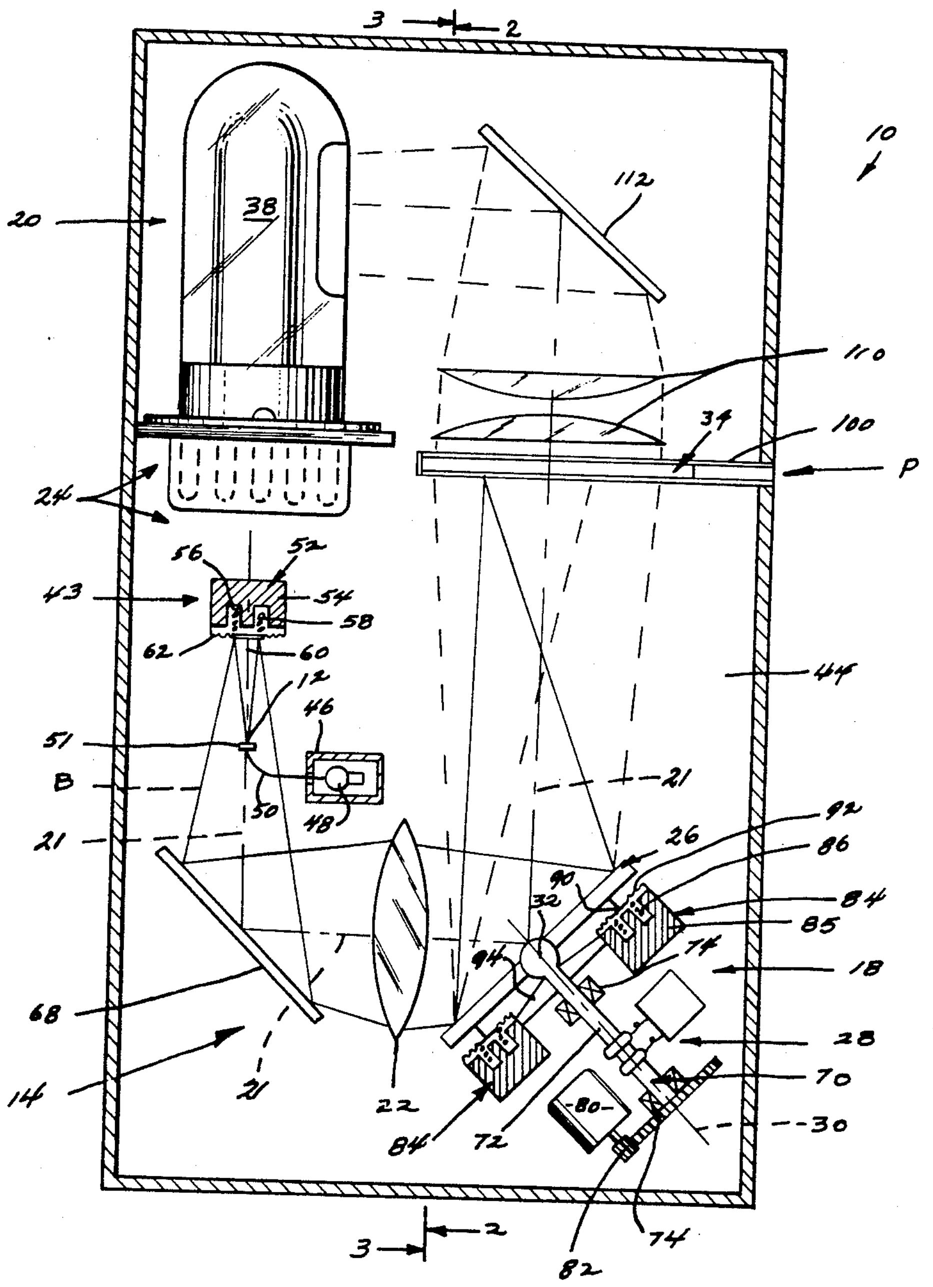
FIG. 1 is a plan view of a present beam scanning apparatus according to the invention.
Figure 2:
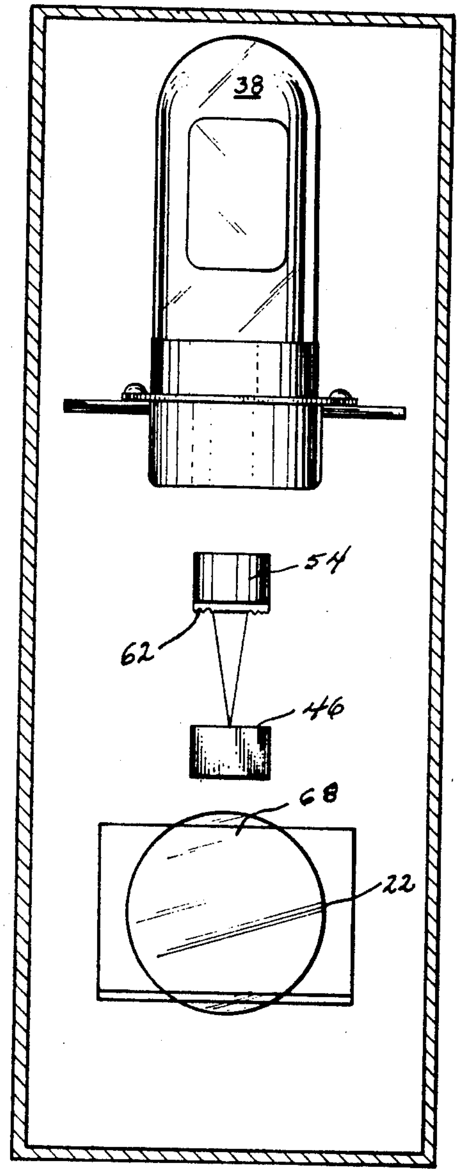
FIG. 2 is a section taken on line 2—2 in FIG. 1.
Figure 3:
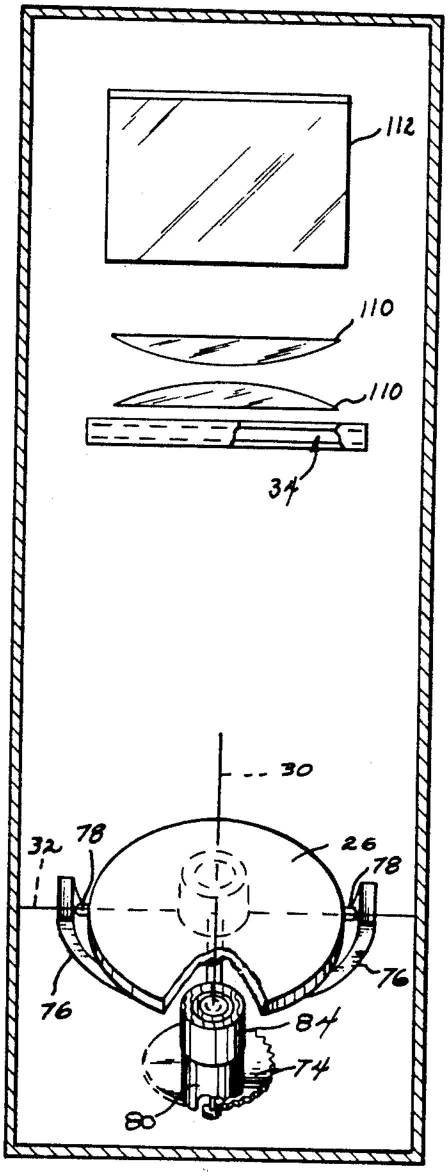
FIG. 3 is a section taken on line 3—3 in FIG. 1.

The invention provides a radiant energy beam scanning apparatus, represented in the drawings by the apparatus 10, having a source 12 of radiant energy, means 14 for projecting a radiant energy beam B from the source to a scanning plane P to produce in the plane a scanning field F, and scanning means 18 for deflecting the beam laterally in a prescribed scanning pattern or motion to cause the scanning field F to trace or follow a prescribed scan track T in the scanning plane. Also included in the apparatus are servo means 20 for sensing or detecting the lateral departure of the scanning field F from its prescribed scan track, generating tracking error signals related to the direction of this departure, and regulating the scanning means 18 in response to the tracking signals to maintain the scanning field on the scan track. In the particular embodiment of the invention which has been selected for illustration in the drawings, the radiant energy source 12 is a source of visible light. Accordingly, the radiant energy beam B is a light-beam. The beam projecting means 14 comprises an optical system, having an optic axis 21, for bringing the light-beam B to sharp focus in the scanning plane P, thereby to produce in the plane the scanning energy field F. In this instance, then, the scanning field is a concentrated, small diameter high intensity light field or spot. The optical system 14 has an objective 22 for thus focusing the light-beam B. According to a feature of the invention, the light source 12 is situated on the optic axis 21 and the scanning apparatus 10 is equipped with beam focusing means 24 for continuously sensing or detecting the effective area of the light field or spot in the scanning plane P and effectively positioning the light source along the axis in such a way as to maintain the beam in sharp focus in the plane.

As will appear from the later description, a variety of scanning means 18 may be employed for deflecting or driving the radiant energy or light-beam B in its prescribed scanning motion. According to a further feature of the invention, however, the scanning means comprises a movable beam deflecting element 26 disposed in the path of the beam for transmitting the latter toward the scanning plane P along a direction line whose angle, relative to the optic axis 21, is determined by the position or orientation of the element relative to the axis. This beam deflecting element is movable in such a way as to cause lateral scanning movement of the beam in any direction and, thereby, scanning motion of the scanning field or spot F about the scanning plane P. Associated with the beam deflecting element 26 are means 28 controlled by the servo means 20 for driving the element in a prescribed scanning motion under the control of the tracking error signals generated by the servo means and in such a way as to cause scanning movement of the scanning field F along its prescribed scan track T. In the particular embodiment of the invention illustrated, the beam deflecting element 26 is a mirror for reflecting the light-beam B from the light source 12 toward the image plane P. This mirror is supported for rotation on an axis 30 transverse to the optic axis 21 and for rocking movement about a pivot axis 32 normal to and intersecting the rotation axis. Thus, the light-beam may be driven in any desired scanning motion by appropriate synchronized rotational movement of the mirror on its rotation axis 30 and rocking motion of the mirror on its pivot axis 32.

Servo means 20 comprises a servo plate 34 situated within the scanning plane P on the optic axis 21 so as to be impinged by the beam B. In the particular beam scanning apparatus illustrated, the beam B, being a light-beam, produces on the servo plate a scanning light-spot which constitutes the scanning energy or light field F. Deflection of the beam through a prescribed scanning motion or pattern by the beam scanning means 18 causes scanning movement of the scanning spot F over the servo plate 34 along the prescribed scan track T. Photographically recorded or otherwise reproduced on the servo plate 34 are fixed frequency tracking signals which define a servo track 36 conforming to or following the scan track T. A portion of the radiant energy or light of the beam B which impinges the track is transmitted from the track to an energy responsive receiver 38, in this instance a light sensitive photo cell such as a photomultiplier, situated adjacent the servo plate. In the particular embodiment of the invention illustrated, the servo plate 34 is a transparency on which the servo track 36 is photographically recorded. Accordingly, light falling on the servo track is transmitted through the track to the region behind the servo plate 34. The photocell 38 is situated in this region so as to receive light transmitted through the servo track.

The tracking signals recorded on the servo track 36 modulate the radiant energy or light of the beam B which is transmitted through the track to the photocell 38 during scanning movement of the beam along the track to produce in the transmitted light incident on the photocell beam tracking information in the form of tracking signal frequencies or components representing the position of the light-spot F relative to the servo track in the lateral direction of the track. The particular servo track illustrated has two laterally spaced track portions 36A, 36B on which are photographically recorded pilot tones, such as sine waves, of different fixed frequencies. Servo track portion 36A thus modulates with a first tracking frequency $f_1$ the light of the beam B which is transmitted through this track portion to the photocell. Servo track portion 36B modulates with a second tracking frequency $f_2$ the light which is transmitted through the latter track portion to the photocell. Typical pilot tone frequencies for the two servo track portions are 14 KHZ and 16 KHZ, respectively. The photocell 38 converts the incident radiant energy or light incident into an electrical output containing information representing the tracking frequencies present in the incident light.

The servo means 20 further comprise a feedback means 42 which operatively connects the beam scanning means 18 and photocell 38. This feedback means controls or regulates the scanning means in response to the electrical tracking information present in the photocell output in such a way as to constantly restore or return the scanning spot F toward its centered position on the scan track T and thereby cause the spot to undergo scanning motion along the track with a high degree of accuracy.

During this scanning motion of the light-beam B along the scan track T, the beam focusing means 24 operates to continuously maintain the beam in sharp focus within the scanning plane P so as to provide a sharply defined scanning spot F on the servo plate 34. In the particular apparatus shown, the diameter of this scanning spot is such that the spot, when centered on the scan track T, illuminates, with equal intensity, the servo track portions 36A, 36B. Under these conditions, the feedback means 42 generates a null signal to indicate that the scanning spot F is centered on its scan track. Lateral departure of the scanning spot from its centered position toward either servo track portion 36A or 36B, increases the corresponding tracking signal frequency component of the light incident on the photocell. Under these conditions, the feedback means generates a tracking error signal related to the direction and magnitude of the departure.

The illustrated focusing means 24 comprises means 43 for effectively dithering, i.e. oscillating, the light source 12 back and forth along the optic axis 21 a short distance at a dither frequency which differs from the tracking signal frequencies introduced into the beam by the servo track 36. This dither motion of the light source causes the effective cross-section of the scanning spot F in the scanning plane P to fluctuate at the dither frequency, thereby introducing into the light incident on the photocell 38 an additional frequency component related to the dither frequency. Accordingly, the output from the photocell contains a dither frequency component. The feedback means 42 includes means for detecting this dither component and providing a focusing error signal which is applied to the light source dithering means 43 to maintain the scanning spot F in sharp focus in the scanning plane P.

It will be apparent at this point that the present beam scanning apparatus can be utilized for a wide variety of applications and can be designed to cause scanning motion of the beam B in virtually any desired scan pattern and, thereby, scanning motion of the scanning field or spot F along virtually any scan track. The particular scan track T illustrated is shown to be a spiral track for reasons to be now explained.

As noted earlier, a second important aspect of the invention is concerned with a unique data recording and playback apparatus which utilizes the beam scanning system described above. The particular beam scanning apparatus illustrated constitutes such a data recording and playback apparatus, or transcribing apparatus as it is referred to herein.

The illustrated data transcriber has a rectangular base plate 44 mounting, adjacent one of its longitudinal edges, an opaque lamp housing 46. Within the housing is a lamp 48. One end of an optical fiber 50 extends through and is secured to one wall of this housing. The end of the fiber within the lamp housing is located adjacent the lamp 48 in such a way that light from the lamp is transmitted through the fiber to the outer end of the fiber. This outer end of the fiber is attached to the base plate 44 by means of a bracket 51 in such a way that the end face of the fiber which is illuminated by the lamp 48, is situated on and faces upwardly along the optic axis 21 in FIG. 1. This illuminated end face of the fiber constitutes the light source 12.

The particular light source dithering means 43 illustrated comprises what is essentially a loud speaker drive unit 52 including a disc shaped permanent magnet 54 coaxially disposed on the optic axis 21. Entering the front surface of this magnet, that is the surface facing the objective 22, is an annular recess 56 containing an axially movable signal coil 58. A mirror 60 is fixed to the front end of this coil in generally centered relation relative to the optic axis 21. The mirror has a front reflective surface in a plane normal to the axis and facing forwardly along the axis toward the objective 22. Attached about its inner perimeter to the outer end of the mirror 60 is a flexible annular diaphragm 62, such as a corrugated diaphragm. The outer edge of this diaphragm is secured to the magnet. Diaphragm 62 supports the signal coil 58 and the mirror 60 for dither motion along the optic axis 21. In this regard, it will be observed that sufficient clearance is provided between the magnet and the coil-mirror assembly to permit such dither motion. The illuminated end face of the optical fiber 50 is situated in front of and faces rearwardly toward the mirror 60. Accordingly, light rays from the lamp 48 within the lamp housing 46 are transmitted through the fiber to the outer end 12 of the fiber and then from this end toward the mirror. The light rays incident on the mirror are reflected back along the optic axis 21 toward the objective 22. As will be explained presently, the coil 58 is energized with a fluctuating dither signal to vibrate the mirror 60 along the axis 21 at the dither frequency in such a way as to produce in the light beam B the dither frequency component referred to earlier.

The optical system 14, which includes the objective 22 and the dithering mirror 60, is a folded optical system having a reflector 68 fixed to the transcriber base plate 44 on the optic axis 21, forwardly of the dithering mirror and adjacent an end edge of the plate. Reflector 68 is positioned at a 45° angle relative to the optic axis 21, as shown. The mirror receives reflected light rays from the dithering mirror 60 and reflects these rays laterally across the transcriber base plate 44 to the beam scanning means 18 which is mounted adjacent the opposite longitudinal edge of the plate directly across from the reflector. The objective 22 is fixed to the base plate in the region between the reflector and the scanning means. The objective has a focal length such that one principal focus of the objective is located approximately at the illuminated end face of the optical fiber 50 and the other principal focus is located in the scanning plane P.

As already noted, the beam scanning means 18 has a beam scanning mirror 26 and a means 28 for driving the scanning mirror in its beam scanning motion. Drive means 28 includes a mirror support 70 having a shaft 72 which is rotatably supported in bearings 74 mounted on the transcriber base plate 44. Fixed to one end of the shaft 72 is a yoke having arms 76 which straddle the scanning mirror 26 along a diameter. The scanning mirror is pivotly supported on the yoke arms by pivot means 78 for rotation relative to the mirror support 70 about the pivot axis 32. The scanning mirror support bearings 74, in turn, support the mirror shaft 72 for rotation on the axis 30. This rotation axis is located in the plane of the folded optic axis 21 and at a 45° angle relative to the optic axis. Accordingly, when the scanning mirror 26 is oriented in a plane normal to the mirror shaft 72, light rays incident on the reflector 68 from the dithering mirror 60 are reflected across the transcriber base 44 along the optic axis 21 through the objective 22 to the scanning mirror and then from this mirror longitudinally of and toward the distal end of the transcriber base along the optic axis.

The scanning mirror 26 has two components of scanning motion. One of these components involves rotation of the mirror about its rotation axis 30. The other component involves rocking motion of the mirror about is pivot axis 32. As already noted, this pivot axis extends diametrically of the scanning mirror and intersects, at right angles, the rotation axis 30 of the scanning mirror shaft. The scanning mirror 26 is driven in its first component of scanning motion by a constant speed motor 80 which drives the scanning mirror shaft 72 in rotation on its rotation axis 30 through a gear train 82. The scanning mirror is driven in its second component of scanning motion by a pair of scanning mirror actuators 84. Each of these scanning actuators is similar to the focusing mirror dither actuator 52. Thus, each scanning actuator has disc shaped permanent magnet 85 and a concentric moving coil 86 which moves axially within an annular recess in the magnet. Fixed to the outer end of the coil is a plate 90 surrounded by an annular flexible diaphragm 92. The inner perimeter of this diaphragm is secured to the outer edge of the plate 90. The outer edge of the diaphragm is fixed to the magnet. The diaphragm 92 supports the plate 90 and moving coil 86 on the magnet 85 for movement axially of the magnet. The scanning actuators 84 are positioned directly behind the scanning mirror 26 at diametrically opposite sides of the scanning mirror support shaft 72 with the axes of the actuator magnets 85 parallel to the axis of the shaft. Extending transversely of the shaft is an actuator support arm 94. This arm is rigidly secured to the shaft and to the actuator magnets so as to rigidly mount these magnets on the scanning mirror shaft. Coils 96 are energized in a manner to be explained presently to move the scanning coils axially. The coils are joined by connecting links 98, such as flexures, to the mirror 26 to rock the latter on its pivot axis 32. As will be explained presently, the scanning coils 86 are energized in such a way as to stress the flexures 98 in tension.

It is evidnet at this point that the beam scanning mirror 26 may be driven in virtually any desired scanning motion by appropriately energizing the scanning motor 80 and the scanning actuators 84. As noted earlier, and hereinafter explained in greater detail, the motor and actuators of the illustrated data transcribing apparatus are energized to drive the scanning mirror in a scanning motion which causes the scanning energy field or light-spot F to trace the spiral scan track T in the scanning plane P.

In this data transcribing apparatus, the scanning plane P extends normal to the optic axis 21 and intersects this axis at a principal focus of the objective 22. Mounted on the transcriber base 44 in this scanning plane is a holder 100 for removably receiving and positioning in the plane, during the recording mode of the transcriber, a recording medium or record and, during the playback mode of the transcriber, a pre-recorded record. In this instance, the servo plate 34, referred to earlier, is a transparency which constitutes a pre-recorded record to be played back in the transcriber, as described presently. Record holder 100 is positioned relative to the optic axis 21 in such a way that when the record 34 is positioned in the holder, the geometric center of the record is situated approximately on the axis.

It is evident from the description to this point that when the lamp 48 is energized, light rays from the lamp are transmitted through the optical fiber 50 to the focusing mirror 60. The light rays are reflected from this mirror along the optic axis 21 to the reflector 68, then from the reflector through the objective 22 to the scanning mirror 26, and finally from the scanning mirror to the record 34 within the plate holder 100. The light rays are brought to focus on the surface of the record, by the objective, to produce on the record a sharply defined optical image of the illuminated outer end face of the optical fiber 50, which constitutes the scanning energy field or spot F. During the later described operation of the transcriber, the scanning mirror 26 is driven in its prescribed scanning motion to cause the scanning spot or image to sweep or trace a spiral scan track on the record.

Figures 4, 5, 5A, 6:
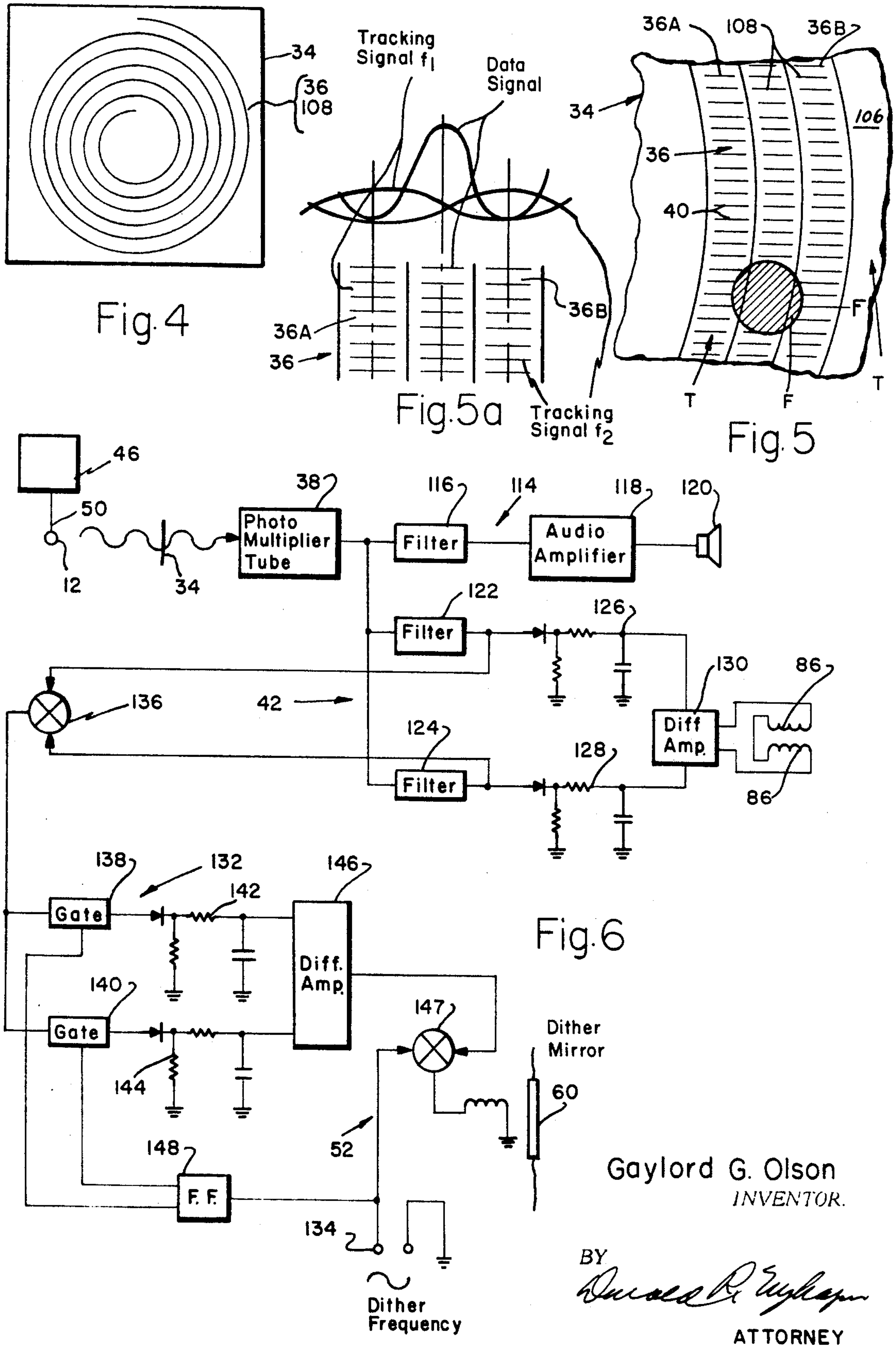
FIG. 4 illustrates a combined servo plate and record plate which is used in the apparatus.
FIG. 5 is a fragmentary enlargement of the plate in FIG. 4 illustrating servo and data tracks which are recorded on the plate.
FIG. 5a illustrates the amplitudes of the signals recorded on the servo and data tracks in FIG. 5.
FIG. 6 is a circuit diagram of the beam scanning apparatus.

Reference is now made to FIGS. 4 and 5 which illustrate, in enlarged detail, a typical pre-recorded record 34 to be played back in the present transcriber. This record has a suitable transparent base 106, such as a glass plate, bearing a data track 108 situated between the spiral servo tracks 36A, 36B. Data track 108 thus has the same spiral shape as the servo tracks. As will be explained presently, data track 108 may be produced in various ways and may comprise a digital data recording, a voice recording, a musical recording, or the like. The physical size of the record may vary, depending upon the length of the recording, the information storage density of the recording, and other factors. As it will appear from the ensuing description, however, a unique feature of the transcriber resides in its ability to record and playback a high density data track of relatively small overall physical dimensions. According to one application of the invention, for example, the transcriber may be utilized as an optical phonograph for playing back musical recordings. In this case, a musical recording of the same length as a standard long-play phonograph disc may be contained on a record plate having dimensions on the order of 2 inches by 2 inches.

During operation of the transcriber as a playback device, the record 34 is positioned in the record holder 100. The lamp 48 is energized to produce on the record the scanning light-spot or image F. The scanning motor 80 and the scanning actuators 84 are then energized to drive the scanning mirror 26 in the appropriate scanning motion to cause scanning movement of the image F along the spiral servo track 36 and data track 108 at a constant linear speed. As the image travels along the tracks, the fixed frequency tracking signals on the servo tracks and data signal on the data track modulate the light which is transmitted through the track and the transparent base 106 of the record to the photocell 38. In this regard, attention is directed to FIG. 1 wherein it will be observed that the illustrated photocell is a photomultiplier tube which is mounted on the transcriber base plate 44 just to the rear of the light-beam focusing unit 52. Mounted on the base plate, between the tube and the record plate holder 100, are a condenser or field lens 110 and a mirror 112. The condenser is situated directly behind the holder so as to collect and concentrate the modulated light emerging from the record 34. The mirror 112 is positioned at a 45° angle to reflect this concentrated modulated light onto the photo sensitive surface of the photomultiplier tube 38.

It is evident from the description to this point that the output of the photocell 38 during operation of the illustrated data transcriber is a modulated signal which represents the summation of several frequencies, to wit, fixed tracking frequencies which are generated by scanning movement of the light-beam B along the servo tracks 36A, 36B on the record 34, a fixed dither frequency which is introduced by the light source dithering means 43, and a data signal which is generated by scanning movement of the light-beam along the data track 108 on the record. As explained below, the feedback system 42 detects the tracking and dither frequencies present in the photocell output and feeds back to the scanning coils 86 of the beam scanning means 18 and to the dithering coil 58 of the light source dithering means 43 corresponding error signals which cause the light-beam to accurately scan along the servo and data tracks and the scanning spot F to remin in focus in the scanning plane P.

Referring to FIG. 6, the data component of the photocell output is detected by a circuit 114 including a filter 116 which filters out the tracking signal frequencies and passes to an amplifier 118 the data signal frequencies present in the photocell output. In this disclosure, it is assumed that the data track 108 contains an audio recording and that the amplifier 118 is an audio amplifier. The output of the amplifier feeds a loud speaker 120 for reproducing the recording.

The feedback means 42 comprises two filters 122 and 124 coupled to the output of the photocell 38. Filter 122 passes the tracking frequency generated by movement of the scanning movement of the light-beam along the servo track 36B. The filter outputs are fed to demodulators 126, 128 which convert the filter output signals 30 to d-c signals proportional to the tracking signal inputs to the respective filters. The d-c output signals from the demodulators are applied to a differential amplifier 130 which produces a d-c tracking error signal whose amplitude ie proportional, to the difference of the input signals and whose polarity represents the greater input signal. It will now be understood that if the scanning beam B is centered on the data track 108, such that the servo tracks 36A, 36B are equally illuminated by the beam, the output of the differential amplifier 130 will be a null signal. On the other hand, if the scanning beam is laterally displaced to either side of its centered position relative to the data track, the output of the differential amplifier will be a d-c signal whose polarity represents the direction of the beam departure from its centered position and whose magnitude represents the extent of the departure. At this point, attention is directed to FIG. 5*a* which illustrates the variation in amplitude across the servo tracks 36A, 36B and the data track 108 of the tracking signals and data signals recorded in the tracks. It will be observed that the amplitude of the data signal substantially exceeds that of the tracking signals. The tracking signals overlap along the data tracks and vary in amplitude across the tracks in a manner such that combined amplitude of the two tracking signals remains constant across the tracks. In this regard, it is significant to note that the servo and data tracks 36A, 36B, and 108 are shown to have distinct boundries only for convenience of illustration and that the recorded signals which actually define these tracks will overlap, as depicted in FIG. 5a. The reason for this overlap and constant combined amplitude of the servo tracks is to provide a tracking error signal from differential amplifier 130 which is a sole function of the lateral departure of the incident light-beam from its centered position on the data track.

The output of the differential amplifier 130 is applied to the coils 86 of the scanning mirror actuators 84 in a manner such that the tracking error signal generated in response to lateral departure of the scanning beam B in either direction from its centered position on the data track 108 returns the beam toward the centered position. To this end, the coil diaphragms 92 are stressed to bias the scanning mirror 26 in opposite directions about its pivot axis 32 to a normal position wherein the scanning spot F falls on either the inner or outer convolution of the servo track 36. The scanning mirror coils are connected in series to the output of the differential amplifier 130 and are wound in opposite directions. Accordingly, the output signal from the differential amplifier 130, in response to lateral departure of the beam B in one direction from the center of the servo track 36 energizes the scanning mirror coils 86 to rotate scanning mirror 36 in one direction on its pivot axis 32 against the action of the mirror actuator diaphragms 92. Similarly, the output signal from the differential amplifier in response to lateral departure of the beam in the opposite direction from the center of the servo track energizes the coils 86 to rotate the scanning mirror in the opposite direction on its pivot axis 32. Thus, the feedback system is so arranged that the error signal produced by the differential amplifier 130 in response to lateral departure of the scanning beam B toward either side of the servo track 36 energizes the scanning mirror coils 82 to rotate the mirror in the proper direction on its pivot axis 32 to return the beam towards its centered position on the servo track. From this description, it is evident that when the scanning mirror drive motor 80 is energized to rotate the scanning mirror 26 on its rotation axis 30, the scanning mirror actuators 84 are controlled by the tracking signal components present in the output of photocell 38 in such a way as to cause the scanning beam B to accurately scan along the spiral servo track 36 and data track 108.

In addition to the tracking control system described above, the feedback system 42 also comprises a focus control system 132. As shown in FIG. 6, the focus control system 132 comprises an a-c source 134 which applies to the coil 58 of the focusing mirror actuator 52 an a-c dither signal of fixed frequency differing substantially from the frequencies of the tracking error signals and the recorded data signal. In the particular embodiment illustrated, for example, wherein the data track 108 is assumed to contain an audio recording, the dither frequency is below the normal audio region. Also included in the focus control system is a summing amplifier 136 whose inputs are connected to the outputs of the tracking signal filters 122, 124. The output of the summing amplifier 136 feeds a pair of gates 138, 140 whose outputs are connected through demodulators 142, 144 to a differential amplifier 146. The output of the differential amplifier 146 and the dither signal from source 134 are fed to a summing amplifier 147, the output of which feeds the focusing mirror actuator coil 58.

Gates 138, 140 receive gating signals from a gating signal source 148, such as a flip-flop, connected to the dither signal source 134. The gating signal source 148 feeds a gating signal to the gate 138 during each positive half cycle of the dither signal and a gating signal to the gate 140 during each negative half cycle of the dither frequency. Each gating signal turns on the respective gate for the duration of the signal.

In operation of the focus control system, the dither signal impressed on the focusing mirror actuator coil 58 drives the focusing mirror 60 in an oscillating dither motion along the optic axis 21. This dither motion of the mirror causes the image plane of the light-spot F, that is the plane of best focus of the light-spot, to oscillate back and forth along the axis 21 relative to the scanning plane P in which is located the transparent record 34. The transcriber is so constructed and arranged that the image plane coincides with the scanning plane, and hence the light-spot F goes through best focus on the surface of the record, at some point in the dither cycle.

From the above description, it is evident that the dither motion of the focusing mirror 60 causes the diameter of the light-spot F on the surface of the transparent record 34 to fluctuate at the dither frequency. The spot diameter is minimum when image plane of the spot coincides with the scanning plane P, i.e. when the light-spot F goes through best focus on the record 34, and increases upon dither motion of the image plane to either side of the scanning plane. The tracking signals fed to the summing amplifier 136 from the tracking signal filters 122, 124 vary in amplitude with the fluctuating light-spot diameter on the record 34. Thus, owing to the small spatial periods of the signals recorded on the servo tracks 36A, 36B and hence the tracking signals, the amplitude of the latter signals is maximum when the light-spot diameter on the record 34 is minimum (best focus position) and diminishes as the spot diameter increases owing to displacement of the light-spot image plane from the scanning plane.

Assume now that the dither motion of the focusing mirror 60 occurs about a mid-position wherein the image plane of the light-spot F coincides with the scanning plane P (best focus position). This mid-position of the dither motion is the best focus mid-position. Under these conditions, the output signals from the gates 138, 140 during the positive and negative half-cycles of the dither signal from the source 134 have equal amplitudes and the differential amplifier 146 produces a null output. On the other hand, if the dither motion of the mirror occurs about a mid-position wherein the light-spot image plane is displaced from the scanning plane, the amplitude of one gate output signal will exceed the amplitude of the other gate output signal. Under these conditions, the differential amplifier 146 produces an error signal output representing the direction and magnitude of the displacement of the light-spot image plane from the scanning plane. The differential amplifier is connected to the focusing mirror actuator coil 58 in a manner such that the error signals from the amplifier energize the coil in a manner which tends to cause the dither motion of the focusing mirror 60 to constantly occur about its best focus mid-position.

The description to this point of the illustrated transcribing apparatus has related only to its use as a playback or reproducing device. The apparatus may also be used as a recording device. In this case, the record 34 will be a recording record which is identical to the pre-recorded record described above except that the data track 108 will comprise a light-sensitive emulsion applied to the surface of the record on which a signal may be recorded. This emulsion will be sufficiently transparent to the incident light to enable passage of light through the emulsion to the underlying overlapping portions of the pre-recorded servo tracks 36A, 36B. The recording apparatus will also include means 150 for modulating the intensity of the light source 12 in accordance with the signal to be recorded. The operation of the recording apparatus is obvious.

What is claimed as new of Letters Patent is:

1. In combination:

a radiant energy source;

optical means for transmitting a radiant energy beam from said source toward an image plane and bringing said beam to focus in a plane of best focus adjacent said image plane;

said optical means comprising focussing means including dithering means for oscillating said best focus plane in a back and forth dither motion along said beam path about a midposition along the path and across said scanning plane whereby the effective area of said scanning field in said scanning plane varies cyclicly and periodically passes through a minimum when said planes coincide, means for sensing said effective field area and generating a focussing error signal representing the direction and amount of displacement of said best focus plane from said scanning plane, and means controlled by said focussing error signal for positioning said midposition of dither motion along said beam path to maintain said planes in coincidence;

said dithering means comprising a dithering mirror for reflecting said beam from said source to said scanning plane, and means for oscillating said dithering mirror along said beam path; and said means controlled by said focussing error signal comprising means for positioning the midpoint of oscillation of said dithering mirror along said beam path in response to said focussing error signal.

2. The beam scanning method which comprises the steps of:

reflecting a beam of radiant energy from a scanning mirror toward and focusing said beam in a scanning plane to form in said plane a scanning energy field;

rotating said mirror on its central axis and rocking said mirror on a pivot axis intersecting said rotation axis to cause the beam to scan approximately along a spiral scan track in said plane;

sensing lateral departure of said beam from said track and generating an error signal representing the direction of departure of the beam; and regulating the angular position of said mirror about said pivot axis in response to said error signal only to cause said beam to remain generally centered on said track during scanning motion of the beam along said track.

3. The method of claim 2 including the additional steps of:

oscillating the plane of best focus of said beam in a back and forth dither motion along the path of said beam about a midposition along said path and across said scanning plane whereby the effective area of said scanning field in said scanning plane varies cyclicly and passes through a minimum when said planes coincide;

sensing the effective area of said scanning energy field in said scanning plane and generating a focusing error signal representing the direction and amount of displacement of said best focus plane from said scanning plane; and regulating the midposition of dither motion along said beam path in response to said signal to maintain said planes in coincidence.

4. Radiant energy beam scanning apparatus comprising:

a radiant energy source;

optical means including a scanning mirror mounted for rotation about its central axis and rocking motion about a pivot axis intersecting said rotation axis for transmitting a radiant energy beam from said source to a scanning plane and bringing said beam to focus in said plane to produce a relatively small area scanning energy field within said plane;

scanning means for driving said mirror in rotation on said rotation axis and rocking said mirror on said pivot axis independently of the rotational speed of said mirror on said rotation axis to cause scanning movement of said scanning field along a spiral scan track said plane; and servo means including means defining said spiral scan track in said scanning field, and means for sensing lateral departure of said scanning field from said track, generating tracking signals representing the direction of said departure, and controlling said scanning means in response to said tracking signals only in such a way as to effect scanning movement of said scanning field along said track.

5. Scanning apparatus according to claim 4 wherein:

said scanning means comprises a motor for driving said mirror in rotation on said rotation axis and means controlled by said tracking signals for rocking said mirror on said pivot axis independently of the rotational speed of the mirror on said rotation axis.

6. Scanning apparatus according to claim 4 wherein:

said scanning means comprises a rotary mirror support, a motor for driving said mirror support in rotation on said rotation axis, means mounting said mirror on said support for rocking on said pivot axis, means connected between said mirror and support for biassing said mirror to a given position on said pivot axis wherein said scanning field falls approximately on one turn of said scan track, and electrical means connected between said mirror and support and controlled by said tracking signals for angularly positioning said mirror about said pivot axis in response to said tracking signals.

7. Scanning apparatus according to claim 4 wherein:

said scanning field has a plane of best focus along the path of said beam; and said optical means comprises focussing means including dithering means for oscillating said best focus plane in a back and forth dither motion along said beam path about a midposition along the path and across said scanning plane whereby the effective area of said scanning field in said scanning plane varies cyclicly and periodically passes through a minimum when said planes coincide, means for sensing said effective field area and generating a focussing error signal representing the direction and amount of displacement of said best focus plane from said scanning plane, and means controlled by said focussing error signal for positioning said misposition of dither motion along said beam path to maintain said planes in coincidence.

8. Scanning apparatus according to claim 7 wherein:

said dithering means comprising a dithering mirror for reflecting said beam from said source to said scanning plane, and means for oscillating said dithering mirror along said beam path; and said means controlled by said focussing error signal comprises means for positioning the midpoint of oscillation of said dithering mirror along said beam path in response to said focussing error signal.

* * * * *